United States Patent [19]

Nakauchi et al.

[11] 4,286,294

[45] Aug. 25, 1981

[54] RECORDING/REPRODUCING SYSTEM

[75] Inventors: Shunsaku Nakauchi; Fumio Watase, both of Mitaka, Japan

[73] Assignee: Kokusai Gijutsu Kaihatsu Co., Ltd., Tokyo, Japan

[21] Appl. No.: 964,657

[22] Filed: Nov. 29, 1978

[30] Foreign Application Priority Data

Dec. 7, 1977 [JP] Japan .................. 52-146876

[51] Int. Cl.$^3$ ............... G11B 5/02; G11B 5/00
[52] U.S. Cl. ............................. 360/27; 360/32
[58] Field of Search .............. 360/27, 28, 32, 73

[56] References Cited

U.S. PATENT DOCUMENTS

| | | | |
|---|---|---|---|
| 3,253,237 | 5/1966 | Runyan | 360/28 |
| 3,347,997 | 10/1967 | Woodruff | 360/27 |
| 3,815,035 | 6/1974 | Griffin | 360/28 |
| 3,975,240 | 3/1976 | Berry | 360/28 |
| 3,975,761 | 8/1976 | Taudt et al. | 360/32 |
| 4,054,921 | 10/1977 | Tarami | 360/27 |

Primary Examiner—Vincent P. Canney
Attorney, Agent, or Firm—McAulay, Fields, Fisher, Goldstein & Nissen

[57] ABSTRACT

In the case that an analog signal is recorded or reproduced by using a sensor and recording medium relatively moving against the sensor, a sampling signal is generated which is adapted to have a frequency thereof deviated dependently upon an amount of wow and flutter caused by fluctuations in the speed of the relative motion therebetween. A reproduced signal is sampled by means of the sampling signal and, a sampled signal is stored in a memory. After this, a stored contents in the memory are read out by using a reading signal with a predetermined frequency, thereby to remove from the reproduced signal varying frequency components caused by the wow and flutter.

5 Claims, 36 Drawing Figures

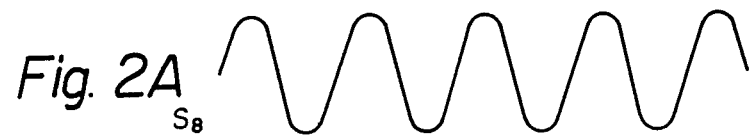
Fig. 2A $S_8$
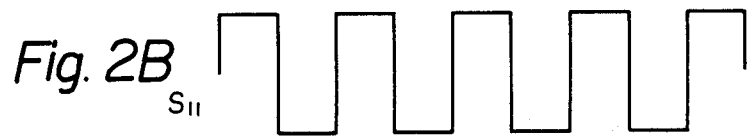
Fig. 2B $S_{11}$
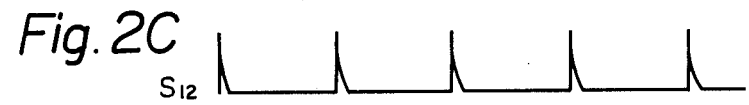
Fig. 2C $S_{12}$
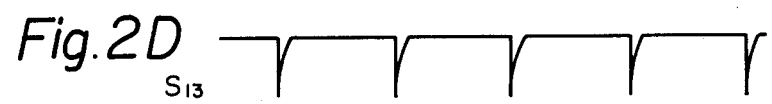
Fig. 2D $S_{13}$
Fig. 2E $S_9$, $S_{10}$

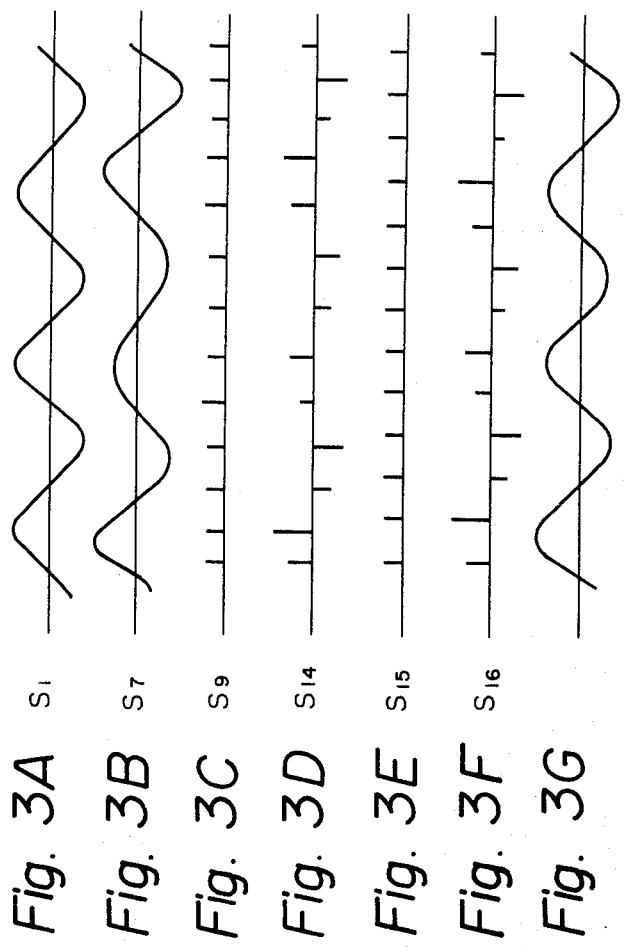

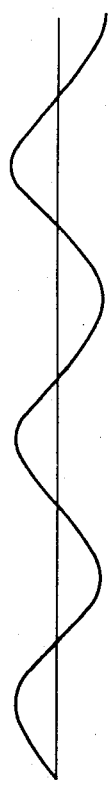
Fig. 7A  S21
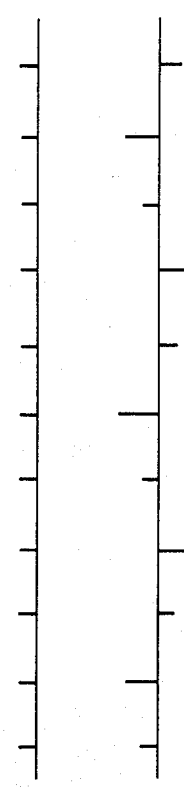
Fig. 7B  S22
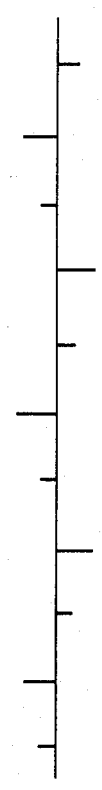
Fig. 7C  S23
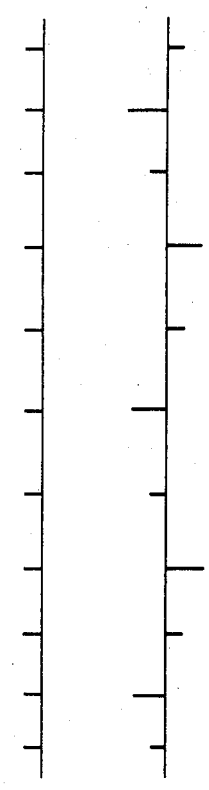
Fig. 7D  S25
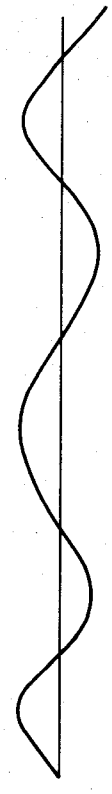
Fig. 7E  S27
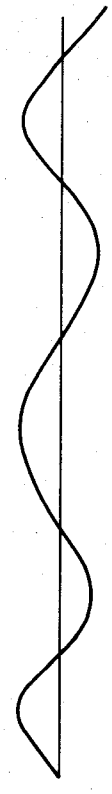
Fig. 7F  S28

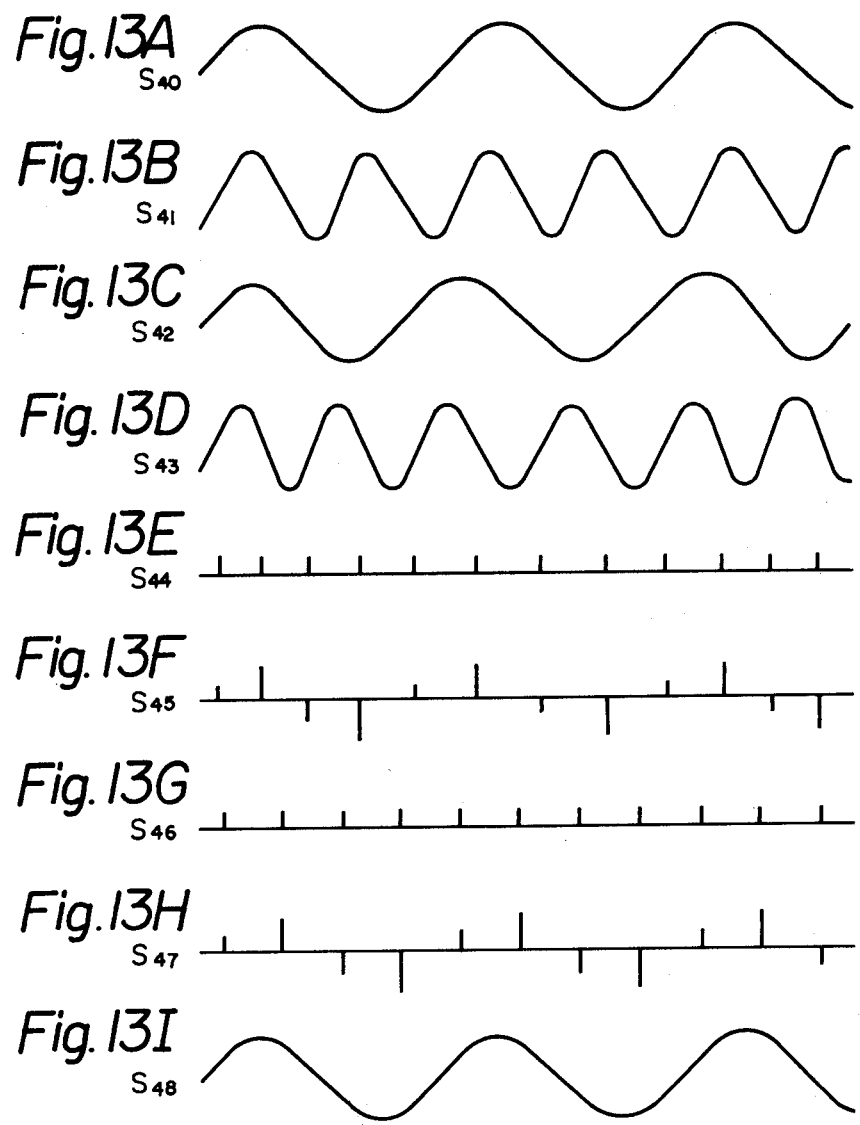

RECORDING/REPRODUCING SYSTEM

The present invention relates to a recording and reproducing system, and more particularly to an analog signal recording/reproducing system which is capable of eliminating the influence of wow and flutter produced in the mechanical driving portion of the system during recording and reproduction of an analog signal, to achieve reproduction of the original signal with high fidelity.

One of the major problems of the conventional recording system for recording and/or reproducing various analog signals including a magnetic tape recording/reproducing system, resides in the fact that it is difficult to maintain the relative speed between the recording medium and the recording/reproducing head at a prescribed value. When the prescribed value is not maintained so-called wow and flutter are produced. Particularly in a recording/reproducing system using a low speed as such relative speed, it is very difficult to keep the wow and flutter at a value of 0.1% or under. There have so far been proposed various improvements in or to the mechanical part of such recording/reproduction systems in attempt to eliminate wow and flutter occurring there. However, none of these improvements have completely eliminated the wow and flutter or have achieved a stable operation of the mechanical driving part of the system for a long operation. Therefore, those recording/reproduction systems in which the wow and flutter characteristics are regarded as important, such as tape recorders for recording and reproducing music, have the problem that a slow tape speed cannot be employed even if a high recording density media is used.

It is, therefore, an object of the invention to provide a novel recording/reproduction system in which the above-mentioned drawback in the prior art is eliminated.

It is a further object of the invention to provide a recording/reproduction system which is capable of electrically eliminating the influence of wow and flutter occurring in the system, to obtain reproduced signals which are identical to the original signals, even if the relative speed between the recording medium and the sensor is not maintained at a prescribed value when recording analog signals onto said recording medium or reproducing information recorded on said recording medium through the relative motion between said recording medium and said sensor.

It is a still further object of the invention to provide a recording/reproduction system which is capable of recording in a discontinuous manner a series of analog signals onto a recording medium in the form of a sheet, and also reproducing information thus discontinuously recorded, in a continuous analog signal which is completely similar to the original signal.

The signals which can actually be recorded and reproduced include voice, music and video signals, all of which have limited frequency bands. For example, voice signals are limited within a range of from 200 to 3500 Hz, and music signals from 20 to 15,000 Hz.

It is a well known sampling theory that accurate definition of the amplitude of a continuous analog signal limited within a particular frequency band can adequately be represented by a series of amplitude values sampled at a certain discrete time interval. According to this sampling theory, if a signal which is a function of amplitude and time is sampled at equal time intervals using a sampling signal having a speed which is at least twice as high as the maximum frequency of said signal, the resulting samples contain all the information contained in the original signal. For instance, a signal with its frequency band limited to ft Hz can be completely defined by a value of amplitude at each time interval of T seconds, T being equal to $\frac{1}{2}$ ft. Such time interval T is usually called a "Nyquist interval".

The present invention is an application of the sampling theory explained above.

According to the invention, there is provided a recording/reproduction system for recording and/or reproducing analog signals by the use of a recording medium arranged for motion relative to a sensor thereof, which comprises: generating a sampling signal which, in reproduction, is adapted to have a period thereof which is deviated depending upon the amount of wow and flutter caused by fluctuations in the speed of said relative motion; sampling a reproduced signal by means of said sampling signal; storing a series of discrete samples thus obtained into a memory; thereafter reading the information thus stored in said memory by means of a reading signal having a predetermined period, and; converting said discrete samples thus read out into an analog signal, thereby to remove from the reproduced signal varying frequency components caused by the wow and flutter. The sampling signal adapted to have its period changed depending upon the amount of wow and flutter caused by fluctuations in the speed of said relative motion can be produced, e.g., by simultaneously recording, in a recording operation, a reference signal having a predetermined frequency together with an analog signal to be recorded, and then, simultaneously reproducing the reference signal which the analog signal is reproduced. As a result, a sampling signal which can have its period changed in response to deviation of the frequency of a reference signal can be obtained. Alternatively, the amount of wow and flutter is detected on the basis of the amount of fluctuation in the relative motion speed between the recording medium and the sensor during reproduction, so that the period of the sampling signal can be varied in accordance with the detected amount. The former measures can remove the influence of both wow and flutter produced in recording and those produced in reproducing. While, the latter measures are particularly effective when the analog signal recorded on the recording medium is not under the influence of wow and flutter produced in recording.

A further feature of the invention lies in providing a recording/reproduction system for recording and/or reproducing analog signals by the use of a recording medium in the form of a sheet arranged for motion relative to a sensor of the system, which comprises: overlaying a predetermined reference signal on an analog signal being recorded, during the recording of said analog signal; sampling said analog signal with which said reference signal is overlaid by means of reference clock pulses having a period of 1/n (n is a positive real number) of said reference signal; temporarily storing sampled values thus obtained in a memory; reading intermittently the stored information from said memory by means of clock pulses having a shorter period than said reference clock pulses; converting the sampled values thus read out into an analog signal; recording said analog signal thus converted onto said sheet-like recording medium in the form of analog block signals, each corresponding to each said intermittent reading;

sampling, in a reproducing operation, each of said analog block signals with clock pulses having a period of 1/n as small as that of the reproduced reference signal; temporarily storing the sampled values thus obtained in a memory; reading the stored information with clock pulses having a period the same as that of said reference clock pulses; converting the sampled values thus read out into an analog signal to obtain a required continuous reproduced analog signal. This system permits the carrying out of a parallel scanning along portions on a recording medium in a rectangular sheet form, at a substantially uniform speed, to record a continuous analog signal in the form of separate block analog signals along the scanning portions of the medium. Each of the block analog signals is stored along each said scanning portions, and these recorded block signals are reproduced as a continuous analog signal. At the same time, it is possible to completely eliminate the signal component due to wow and flutter produced during the scanning by the sensor from the reproduced signal.

The recording/reproduction system according to the invention is widely applicable, not only to a magnetic recording/reproduction system and a disk recording/reproduction system, but also to an optical recording/reproduction system, including a sound track recording/reproduction system for motion pictures with sound.

Further objects and advantages of the present invention will become apparent to those skilled in the art to which the invention pertains from the following description.

The operation of the invention itself will best be understood from the following description, when read in connection with the accompanying drawings, in which:

FIG. 1 is a block diagram illustrating one embodiment of the invention;

FIGS. 2A through 2E, and FIGS. 3A through 3G are wave form charts of signals available in various portions of FIG. 1;

FIGS. 7A through 7F are waveform charts of signals available in various portions of the circuit of FIG. 6;

Figure 9:
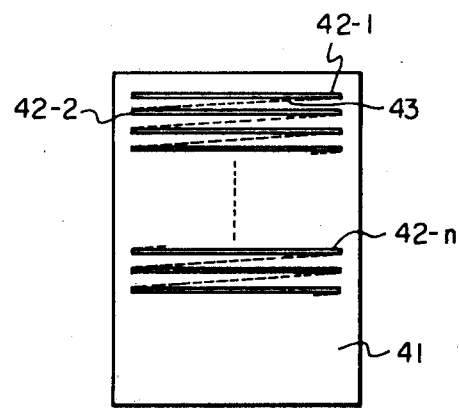
Figure 10:
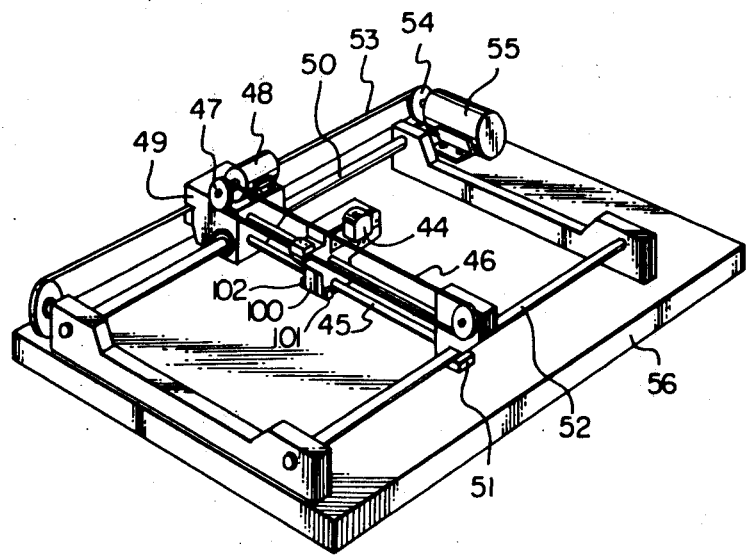
Figure 11:
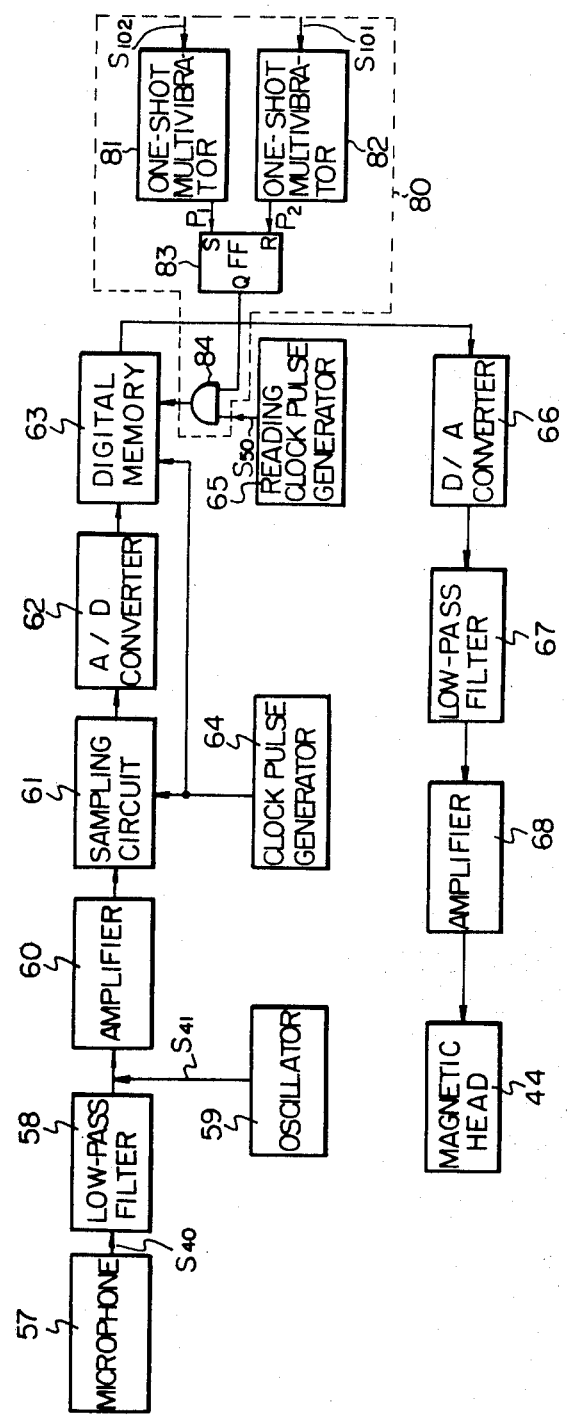
Figure 12:
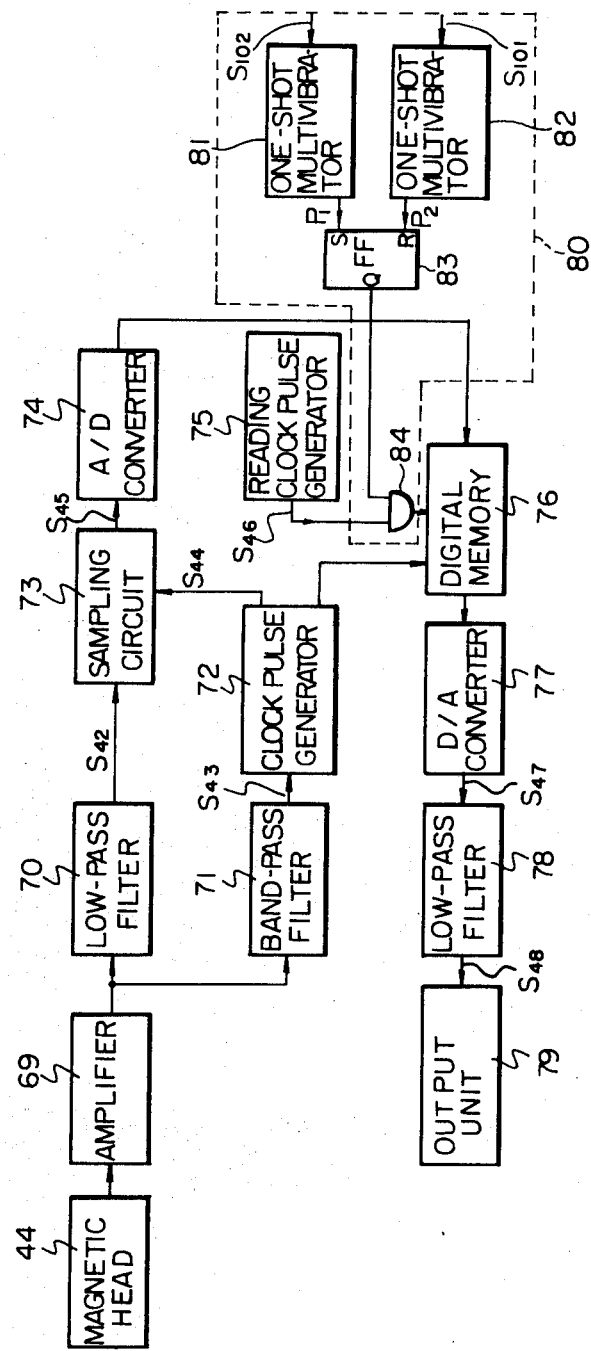

FIG. 9 concerns still another embodiment of the invention, and illustrates the scanning manner employed thereby;

FIG. 10 is a schematic perspective view illustrating an example of the scanning mechanism for putting into practice the scanning manner of FIG. 9;

FIG. 11 is a block diagram of the recording system of the mechanism of FIG. 10;

FIG. 12 is a block diagram of the reproducing system of the mechanism of FIG. 10, and;

FIGS. 13A through 13I are waveform charts of signals available in various parts illustrated in FIGS. 11 and 12.

Figure 1:
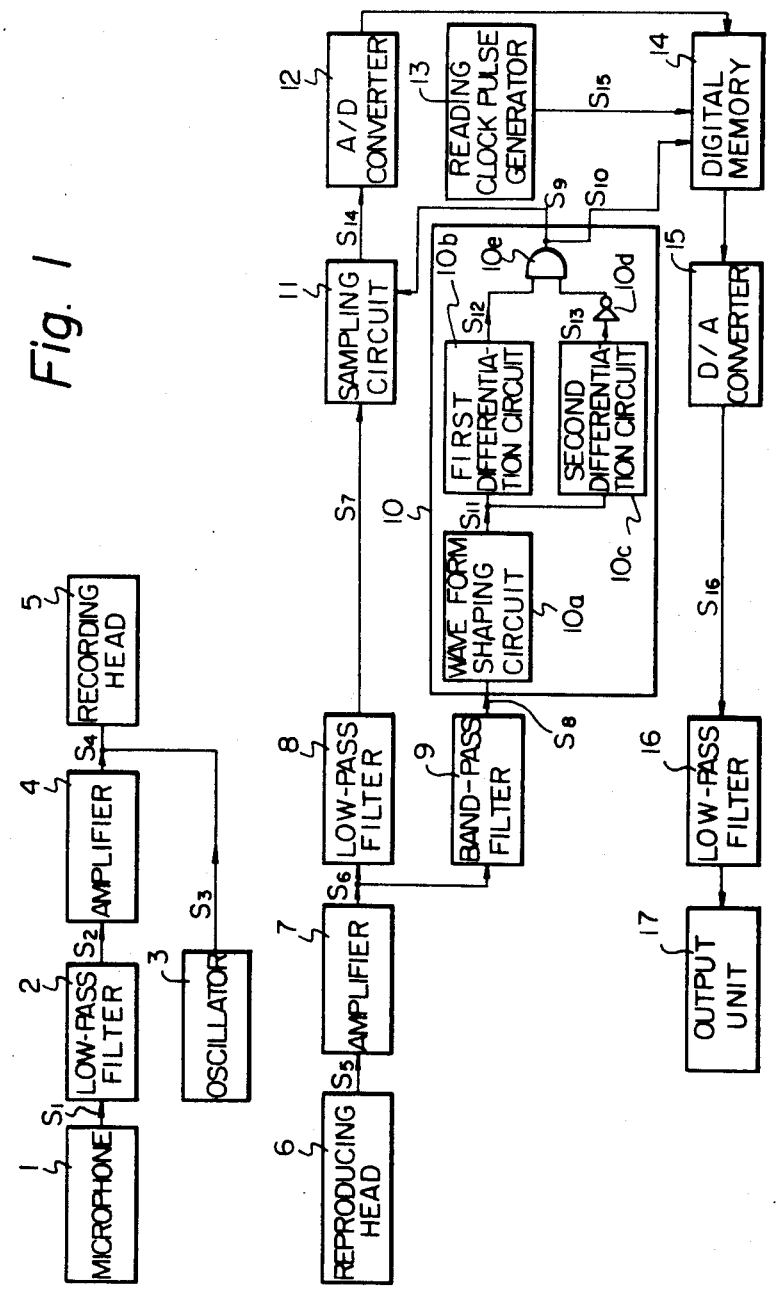

FIG. 1 is a block diagram of the signal system of a magnetic tape recorder which performs recording and reproducing of a voice signal with its upper frequency limited to 3,500 Hz, according to the system of the invention. Referring to FIG. 1, the voice to be recorded is converted into an electrical signal $S_1$ by means of microphone 1. The signal $S_1$ passes into a low-pass filter 2 so that, of the frequency components contained in the signal $S_1$ only those of 3,500 Hz and under are passed out of the low-pass filter 2. The signal $S_2$ with a thus limited frequency band from the low-pass filter 2 is then passed into an amplifier 4. The recording system is provided with an oscillator 3 for producing a single frequency signal. A reference signal $S_3$ produced by the oscillator 3 is applied to a recording head 5 together with a recording signal $S_4$ delivered from the amplifier 4 as an amplified output. As hereinafter described in detail, the reference signal $S_3$ is used to remove fluctuating frequency components, produced under the influence of wow and flutter, contained in the reproduced signal in reproducing operation. As the frequency of the reference signal $S_3$ is selected so that it is a little higher than the frequency band limited by the low-pass filter 2. In this embodiment, 4 kHz is selected as frequency of reference signal $S_3$.

The frequency stability of the oscillator 3 constitutes one of the important factors for determining the wow and flutter of the whole system and, accordingly, a crystal controlled oscillator or the like should preferably be used as the oscillator 3. The recording signal $S_4$ and the reference signal $S_3$ are both passed into the recording head 5 at one time, and are magnetically recorded as analog signals on a magnetic tape, not illustrated. The magnetic tape is moved relative to the recording head 5 at a predetermined speed by means of a conventional magnetic tape feed mechanism, not illustrated. Thus, the recorded signal recorded on the magnetic tape is an overlaid signal consisting of the recording signal $S_4$ and the reference signal $S_3$. A conventional recording method can be used for magnetically recording these signals $S_4$ and $S_3$. On the magnetic tape, not illustrated, by means of recording head 5.

Referring next to the reproducing system, the above-mentioned magnetic tape feed mechanism feeds the magnetic tape, on which said signals are recorded as mentioned above, at a predetermined speed. A reproducing head 6 is arranged in urging contact with the running magnetic tape, to convert into an electrical signal the information magnetically recorded on the magnetic tape in the same manner as the conventional reproducing method employed by the conventional tape recorder mechanism. The reproduced signal $S_5$ from the reproducing head 6 is amplified by an amplifier 7 to produce an output signal $S_6$. The signal $S_6$ is applied to both a low-pass filter 8, having the same filtration characteristics as the low-pass filter 2, and a band-pass filter 9, which passes only signal components of 4 kHz frequency with a deviation within a range of from several ten Hz to several hundred Hz. Thus, the low-pass filter 8 selects only an output signal $S_7$, corresponding to the desired recorded signal $S_4$ contained in the output signal $S_6$, while the band-pass filter 9 picks up only an output signal $S_8$, corresponding to the reference signal $S_3$ recorded simultaneously with the voice signal.

The output signal $S_7$ has amplitude characteristics nearly equal to those of the recorded signal $S_4$, but contains wow and flutter corresponding to the wow and flutter caused by the tape feed mechanism during the recording or reproducing operation. This wow and flutter has a value on the order of from 0.1% to 0.15% in an ordinary type cassette tape recorder with a tape feed speed of 4.75 cm/sec. The reproduced reference signal $S_8$ delivered from the band-pass filter 9 has undergone amplitude and frequency modulation due to the wow and flutter so as to have a definite frequency band. The wow and flutter contained in signal $S_8$ is in synchronism with and of the same magnitude as the wow and flutter contained in the voice signal, because the output from the oscillator 3 was recorded on a single channel together with the voice signal in recording the latter. The reproduced reference signal $S_8$ from the band-pass filter 9 is then applied to a clock pulse generator 10 to provide a sampling clock signal $S_9$ and a writing clock signal $S_{10}$. The clock pulse generator 10 includes a waveform shaping circuit 10a for converting the reproduced reference signal $S_8$ from a sine wave signal into a square wave signal $S_{11}$ (refer to FIGS. 2A and 2B). This square wave signal $S_{11}$ is then passed to a first differentiation circuit 10b and a second differentiation circuit 10c. A differential signal $S_{12}$ (FIG. 2C), rising at a rising point of the square wave signal $S_{11}$, is obtained through the circuit 10b, whereas a differential signal $S_{13}$ (FIG. 2D), trailing at a trailing point of the square wave signal $S_{11}$, is obtained by the circuit 10c. The differential signal $S_{13}$ has its polarity reversed by an invertor 10d, and is then synthesized with said differential signal $S_{12}$ by an AND circuit 10e into the sampling clock signal $S_9$ and writing clock signal $S_{10}$. Accordingly, both the signals $S_9$ and $S_{10}$ have frequencies twice as high as the frequency of the reproduced reference signal $S_8$. Since these signals $S_9$, $S_{10}$ have been generated with reference to the reproduced reference signal $S_8$ which has undergone frequency modulation due to the wow and flutter, the frequencies of these signals $S_9$, $S_{10}$ are modulated in accordance with the wow and flutter.

The sampling clock signal $S_9$ is fed to the sampling circuit 11 so that the output signal $S_7$ then present in the sampling circuit 11 is sampled by means of the sampling clock signal $S_9$ into analog sampled values $a_1, a_2 \ldots$, which are then applied to an A/D converter 12, which in turn produces corresponding digital data $d_1, d_2 \ldots$, to be fed to a digital memory 14. The digital memory 14 has been supplied with writing pulses $S_{10}$ from the clock pulse generator 10, so that it is adapted to sequentially store the digital data $d_1, d_2 \ldots$ sequentially delivered from the A/D converter 12.

The data stored in the digital memory 14 are read with reading clock pulses $S_{15}$ delivered from the reading clock pulse generator 13. The period of said reading clock pulses $S_{15}$ is accurately predetermined to be a period which is one-half the period of the reference signal $S_3$ produced from the generaor 13, that is, a period of 1/8,000 sec. Accordingly, a series of reproduced signals read in digital form from the memory 14 no longer contain fluctuating frequency components due to the wow and flutter. Since the period of the reading clock pulses $S_{15}$ has to be exactly one-half the period of the reference signal $S_3$, the reading clock pulse generator 13 should preferably be formed by a crystal control oscillator.

The output data from the digital memory 14 are converted into analog sampled values by a D/A converter 15, to be then reinstated into the original signal by means of a low-pass filter 16 which passes frequencies of 3.5 kHz and under, and applied to an output unit 17. The output unit 17 which comprises an amplifier and a loud-speaker, amplifies signals from the low-pass filter 16 and provides voice output through a loud-speaker or like means.

Referring to FIG. 3, the operation of the system shown in FIG. 1 will now be described, assuming that the electrical signal $S_1$ is a single frequency signal having a frequency of 2,000 Hz.

FIG. 3A illustrate a signal $S_1$ which has a frequency of 2,000 Hz. As previously mentioned, this signal $S_1$ is recorded on a magnetic tape together with a signal with a frequency of 4 kHz overlaying the signal $S_1$, and is reproduced by the reproducing head 6 to provide through the low-pass filter 8 an output signal $S_7$, as illustrated in FIG. 3B. As will be understood from a comparison between the waveform in FIG. 3A and that in FIG. 3B, the waveform shown in FIG. 3B is distorted due to the frequency modulation and amplitude modulation caused by the wow and flutter produced in the recording and reproducing operation, because it has been obtained through reproduction of a signal recorded on a magnetic tape. FIG. 3C illustrates a sampling clock signal $S_9$ which has been prepared from a reproduced reference signal $S_8$, obtained by reproducing the reference signal $S_3$ which was superposed upon the signal $S_1$ when the latter was recorded. Since the reproduced reference signal $S_8$ has also been influenced by the same wow and flutter as influenced the signal $S_7$, the signal $S_8$ has its period varied in synchronism with the signal $S_7$. If the sampling circuit 11 samples this output signal $S_7$ with reference to the reproduced reference signal $S_8$, a sampled signal $S_{14}$ is obtained which consists of a series of analog sampled values $a_1, a_2, \ldots a_n$. When these analog samples $a_1, a_2 \ldots a_n$ have been digitized and stored in the memory 14, and these digital data stored have been read out by the reading clock pulses $S_{15}$ shown in FIG. 3E and extracted through D/A converter 15, an analog sampled-data signal $S_{16}$ is obtained as illustrated in FIG. 3F. A comparison between the signals illustrated in FIGS. 3D and 3F shows that the signal $S_{14}$ has irregular time intervals between the individual adjacent samples, whereas the signal $S_{16}$ has uniform time intervals between the individual adjacent samples, since it has been read out with the signal $S_{15}$ whose pulse repetition period is accurately set to 1/8,000 second.

As mentioned above, the irregularity in the time intervals between the individual adjacent samples is due to the wow and flutter. These irregular time intervals have thus been corrected into the regular given time intervals illustrated in FIG. 3F. That is, the fluctuating frequency components produced by the wow and flutter have been removed by the above-mentioned operations, so that the resulting signal $S_{16}$ is equivalent to a signal obtained by sampling the waveform of the original signal (in FIG. 3A) with reference to the sampling pulses with a period of 1/8,000 second. Thus, if this signal $S_{16}$ is passed to the low-pass filter 16, a reproduced signal $S_{17}$ can be obtained which has a waveform identical with that of the original signal, as illustrated in FIG. 3G. While the frequency modulation distortion applied to the signal $S_1$ by the wow and flutter in the recording and reproducing operation has disappeared from the reproduced signal $S_{17}$, the amplitude modulation distortion caused by the fluctuations in the relative speed between the tape and the head due to wow and flutter is still present in the signal $S_{17}$. However, since the human ear is somewhat insensitive to fluctuations in amplitude, even though it is rather sensitive to those in frequency, fluctuations in amplitude on the order of 1-2% are practically acceptable.

Since the amplitude of a reproduced signal is proportional to the relative speed between the reproducing head and the tape, it is possible to remove the amplitude modulation distortion due to wow and flutter, by measuring the intervals between the individual samples of the sampling clock signal $S_9$, so as to correct the amplitude of the analog sampled values according to the measured values.

Fluctuation in the amplitude of a reproduced signal is not very important to audio recording/reproduction systems, as mentioned above. However, with regard to those recording systems for recording the velocity, vibration, etc., of an object, which are required to reproduce accurately the amplitude of the object, it is very important to correct the amplitude through measurement of the pulse intervals of signal $S_9$ illustrated in FIG. 3C.

In the arrangement of FIG. 1, the number per unit time of data passed to the digital memory 14, depends upon the mean feed speed of the magnetic tape; whereas the number per unit time of data delivered as output from the memory 14, depends upon the generation rate of pulses from the clock pulse generator 13, and; thus, both are independent of each other in a sense. This causes an inconvenience, for instance, in the event that the tape speed happens to be different in recording and reproduction. If there is a difference in the tape speed in the recording operation and the reproducing operation, the amount of the data stored in the digital memory 12 may exceed the maximum memory capacity thereof or may become empty. Such phenomena can be prevented by providing an arrangement in which the reading clock pulse repetition period of the generator 13 is determined on the basis of the mean clock pulse repetition period of the clock pulse generator 10. By such arrangement, the influence of wow and flutter can be avoided so that there is neither excess nor shortage in the data stored in the digital memory 14. However, if there occurs a difference in the mean tape feed speed in recording and reproduction, the reproduced waveform (in FIG. 3E) has its frequency generally equally deviated from that of the original waveform. To prevent such excess or shortage in the contents of the digital memory 14, and also to ensure reproduction of a waveform with its frequency exactly the same with that of the original waveform, the pulse repetition periods of the oscillator 3 and the reading clock pulse generator 13 may be accurately controlled to have predetermined values by means of crystal control or any other suitable measures, and; at the same time, the number of samples fed to the digital memory 14 and the number of output samples therefrom, in other words, the number of clock pulses from the clock pulse generator 10 and those from the reading clock pulse generator 13, may be measured all the time, while simultaneously the tape feed motor is provided with the necessary feedback for controlling the tape speed so as to keep both clock pulse numbers the same per unit time on an average. More specifically, the motor speed is increased when the mean generation rate of clock pulses from the clock pulse generator 10 is smaller than that of clock pulses from the reading clock pulse generator 13, and is decreased when the former is larger than the latter. In this case, it is sufficient if the mean values of both rates are compared with each other. That is, it matters little whether any instantaneous values thereof are different from each other owing to wow and flutter, etc.

By providing the above described arrangement, the reproduced waveform can be free of the influence of wow and flutter and have exactly the same frequency as that of the original waveform.

In this embodiment, the signal to be recorded and the reference signal are recorded on the same recording track of the recording medium. However, the reference signal may be recorded on a recording track other than the recording track on which the signal to be recorded is recorded. In this case, it is required to provide another recording head for recording the signal $S_3$ and another reproducing head for obtaining the reproduced reference signal during the reproducing operation, and the signal $S_3$ should be applied to the other recording head directly. Moreover, the reproduced reference signal obtained from the other reproducing head can be directly applied to the clock pulse generator 10, without passing through the band-pass filter 9, after amplifying the reproduced reference signal.

Tape recorders available on the market today usually have about a plus and minus 1% fluctuation for the average tape feed speed. According to the invention, this fluctuation can be removed at the same time the wow and flutter is removed.

Figure 4:
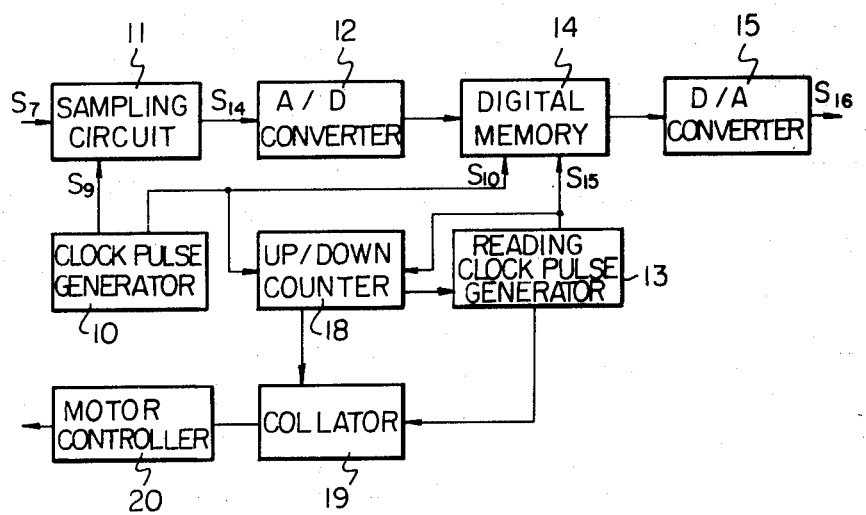
FIG. 4 is a block diagram of an essential part of the control for the tape feed motor, employed in the embodiment of FIG. 1.

An embodiment of the motor control used for the above-mentioned purpose is illustrated in block diagram in FIG. 4. In the drawing, reference numeral 18 designates an adder-subtracter, 19 a collator, and 20 a motor controller. The blocks designated by reference numerals 10 through 15 correspond respectively to those designated by identical reference numerals in FIG. 1.

The adder-subtracter 18 is a binary counter which is arranged to be driven for an adding operation by the writing pulses $S_{10}$ from the clock pulse generator 10, and for a subtracting operation by clock pulse from the clock pulse generator 13. When the tape recorder starts its reproducing operation, at first, data are fed to and stored in the digital memory 14, while simultaneously the counter 18 accumulates the number of these data. When the data stored in the digital memory 14 reach a predetermined amount, the collator 19 supplies a signal to the reading clock pulse generator 13, which in turn starts generating clock pulses at a predetermined accurate interval of time to read the registered data from the digital memory 14 and feed them to the D/A converter 15. The amount of data stored in the digital memory 14 can be confirmed by referring to the adder-subtracter 18 for the number counted thereby. The collator 19 supervises said amount of stored data all the time, and is adapted to actuate the motor controller 20 to decrease the motor speed for lowering the tape feed speed if the stored data surpasses a predetermined amount, and to actuate the motor controller 20 to increase the tape speed if the stored data amount has decreases too much. In this manner, the average tape feed speed can be controlled with the same accuracy as that of the reading clock pulse generator 13, which emits pulses at an accurate predetermined interval of time.

In the above-described embodiment, the memory used consists of a digital memory, but substantially the same results can be expected by the use of an analog memory. As one of the preferable analog memories, an analog shift memory exploying a CCD (Charge Coupled Device) can be used. Use of the analog shift memory makes it unnecessary to use the A/D converter 12 and the D/A converter 15, illustrated in FIGS. 1 and 4. If the analog shift register is used, three such registers will be required since the input clock pulses and the output clock pulses for one analog shift register have to be identical with each other. If a first register becomes full of analog samples, the input is switched over to a second register, so that stored data can be taken out from said first register while said second register is supplied with the input. When the second register has become full of analog samples, the input is switched over to a third register. When the third register has stored samples to the limit of its capacity, the first register is again supplied with the input. The same cycle then is repeated. Under this arrangement, the output signal from the clock pulse generator 10, for writing the input signal, need not have the same pulse repetition period as the output signal from the reading clock pulse generator 13.

As mentioned above, a magnetic recording/reproduction device which is stable in operation and has very excellent wow and flutter characteristics can be obtained according to the system of the invention, which comprises the steps of: recording together with a signal to be recorded a reference signal having an accurate predetermined period of a frequency higher than the maximum frequency of said signal to be recorded, on the same magnetic tape; in the reproducing operation, sampling the analog signal being produced by the use of sampling clock pulses produced on the basis of the reference frequency which is reproduced; storing the resulting sampled values in a digital memory or an analog memory; reading the stored contents by the use of reading clock pulses having an accurate period, and; reproducing the recorded signal in its original state after passing it through a low-pass filter.

Also a very accurate tape feed speed can be obtained according to the system of the invention since the system is also capable of controlling the tape feed speed so as to adjustably vary it according to the contents stored in the memory. Furthermore, it is very easy to reduce the wow and flutter present in the reproduced signal to $10^{-3}$ [%] or under of that present in the original signal, and also to reduce the frequency difference between the reproduced signal and the original signal to $10^{-3}$ [%] or under, if the oscillator 3 and the reading clock pulse generator 13 are controlled by means of a crystal oscillating element. Such accuracy can never be attained by improvements to the conventional tape feed mechanism, and in this sense the present invention is very effective. The invention is particularly effective, for instance, in the case of recording/reproducing the human voice for a long time at a very low tape speed of less than 1 cm per second, or reproducing music signals of good quality with high fidelity, or recording/reproducing physical phenomena with high accuracy.

Although the foregoing description concerns an embodiment in which the invention has been applied to the magnetic tape recording/reproduction system, it goes without saying that the invention can equally be applied to the magnetic disc system, or the magnetic or optical sound reproduction for sound motion pictures, etc., with equivalent effects.

The above-described embodiment employs a method comprising recording a reference signal superposed on a recording signal on the same recording medium, and determining the period of the sampling clock pulses with reference to the reproduced waveform of said reference signal. However, the present invention is not limited to said system.

Figure 5:
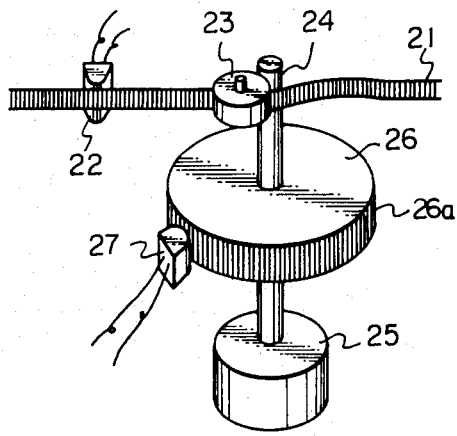
FIG. 5 is a schematic block diagram illustrating an essential part of another embodiment of the invention.
Figure 6:
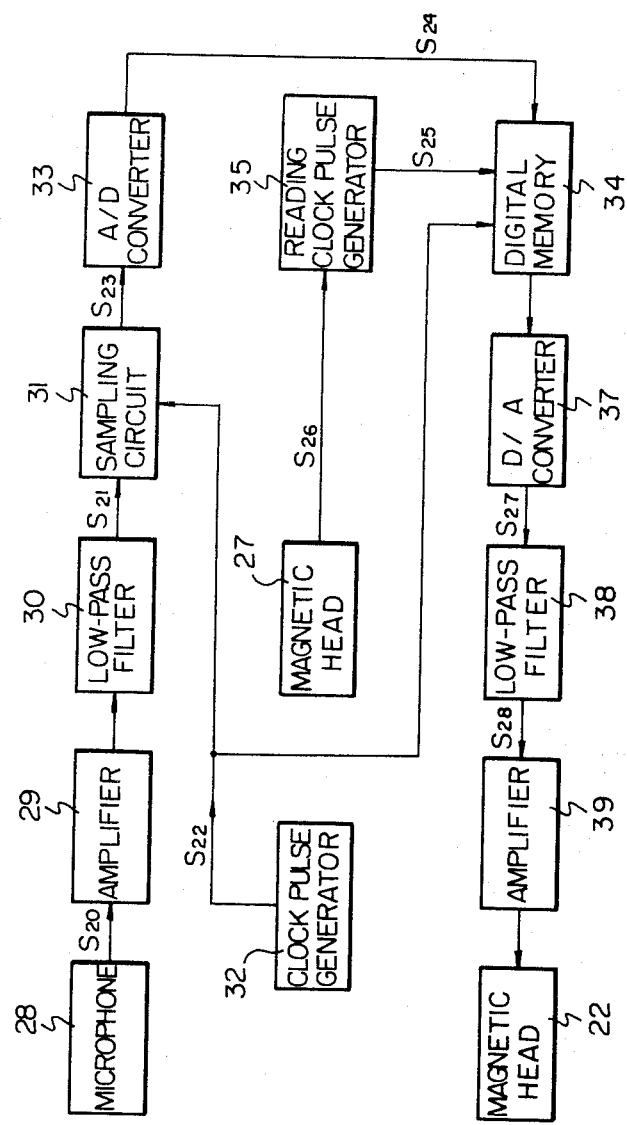
FIG. 6 is a block diagram illustrating an example of the recording circuit used in the embodiment of FIG. 5.

Referring next to FIGS. 5, 6 and 7, another embodiment will now be described in which the periods of the sampling clock pulses for writing and reading are determined by an output from a speed sensor for detecting the relative speed between the recording medium and a sensor (a recording or a reproducing head) in a recording or reproducing operation. In this embodiment, a voice signal is recorded on a magnetic tape, with its frequency band limited to 3,500 Hz.

FIG. 5 schematically illustrates a mechanism for detecting the relative speed between a magnetic tape 21 and a magnetic head 22. The magnetic tape 21 is kept in urging contact with a capstan 24 by a pinch roller 23. The capstan 24 is driven for rotation by a driving motor 25. A disc 26 is concentrically secured to said capstan and has its circumferential surface formed by a layer of thin magnetic film for magnetic recording. Arranged close to the circumferential surface of the disc 26 is a magnetic head 27 for reading signals magnetically recorded on the thin magnetic film layer 26a. Magnetically recorded on the thin magnetic film layer 26a is a sine wave signal of a predetermined wave length for detecting the rotational speed of the disc 26 or that of the capstan 24.

FIG. 6 is a block diagram of a magnetic recording circuit arranged in combination with the mechanism shown in FIG. 5. A voice to be recorded is first converted into an electrical signal $S_{20}$ by a microphone 28. The signal $S_{20}$ is then amplified by an amplifier 29, and the amplified signal is passed through a low-pass filter 30 to be supplied as a recorded voice signal $S_{21}$ with its upper frequency limited to 3,500 Hz. The recorded voice signal $S_{21}$ is then applied to a sampling circuit 31 which is supplied with a clock signal $S_{22}$, with a precise period of 1/8,000 second produced by a clock pulse generator 32, as a sampling signal, so that the signal $S_{21}$ is converted into an analog sampled signal $S_{23}$ in discrete form. The analog sampled signal $S_{23}$ is converted into a digital signal $S_{24}$ by an A/D converter 33 and stored in a digital memory 34, which is supplied with the clock signal $S_{22}$ as a reading signal. The digital signal $S_{24}$ stored in the digital memory 34 is read out by reading clock pulses $S_{25}$ supplied from a reading clock pulse generator 35. The reading clock pulses $S_{25}$ are controlled by means of instantaneous values of the speed of the capstan 24, detected by the signal from the magnetic head 27 illustrated in FIG. 5. The reading clock pulses have a mean period controlled to agree with that of the writing clock pulse from the clock pulse generator 32 by means of measures as hereinafter described.

Any fluctuation in the speed of the capstan 24 causes a corresponding fluctuation in the speed of the magnetic tape 21, which also causes a variation in the period of the sine wave signal $S_{26}$ read out by the magnetic head 27 in synchronism with the speed of the magnetic tape 21. That is, the sine wave signal $S_{26}$ has a frequency which is varied in response to the fluctuation in the capstan speed (i.e. wow and flutter). The digital signal read from the digital memory 34 with reading time interval varied in accordance with the wow and flutter is converted into an analog sampled signal $S_{27}$ in discrete form by a D/A converter 37. The time interval between adjacent samples (hereinafter called merely "time interval") from the D/A converter 37 is varied in synchronism with the wow and flutter. The analog sampled signal $S_{27}$ delivered from the D/A converter 37 has its time interval lengthened proportionately to decreases in the speed of the magnetic tape 21, and shortened proportionately to increases in the speed.

The discrete analog sampled signal $S_{27}$ is converted into a continuous analog signal $S_{28}$ by a low-pass filter 38. Then, the continuous analog signal $S_{28}$ is amplified by an amplifier 39 and applied to a magnetic head 22 to be magnetically recorded on a magnetic tape. The analog signal $S_{28}$ contains wow and flutter synchronous with the wow and flutter of the capstan 24 or that of the magnetic tape 21. More specifically, as the speed of the tape 21 is slowed down to less than a prescribed value due to the change in the capstan speed, the wave length of the analog signal $S_{28}$, which is a recorded signal actually applied to the magnetic head 22, becomes longer than the wave length of the recorded voice signal which is the original input signal; while, on the other hand, as the tape speed is accelerated up to more than the prescribed value, the wave length of the analog signal $S_{28}$ becomes correspondingly shorter than that of the recorded voice signal $S_{21}$. Since the recorded signal has its wave length elongated or contracted, with respect to the wave length of the original signal, synchronously with the fluctuations in the speed of magnetic tape 21 or wow and flutter, the wow and flutter is cancelled so that the signal magnetically recorded on the tape 21 is free of the effects of the wow and flutter.

Next, the operation of the system illustrated in FIGS. 5 and 6 will be described in detail with reference to FIG. 7, with the assumption that the electrical signal $S_{20}$ is a single frequency signal having a frequency of 2,000 Hz.

FIG. 7A illustrates a recorded voice signal $S_{21}$. The signal $S_{21}$ is sampled by a clock signal $S_{22}$, illustrated in FIG. 7B, whose period is set at 1/8000 second, into an analog sampled signal $S_{23}$, illustrated in FIG. 7C. All the samples of the analog sampled signal $S_{23}$ are converted into digital data and temporarily stored in the memory 34. The contents in the memory 34 are read by means of the reading clock pulses $S_{25}$ (FIG. 7D), whose period varies in accordance with the magnitude of the wow and flutter, and the digital data thus read out are subjected to D/A conversion into an analog sampled signal $S_{27}$, illustrated in FIG. 7E. The analog sampled signal $S_{27}$ is converted into a continuous analog signal $S_{28}$ by the low-pass filter 38.

In FIG. 7, the signals are illustrated with an assumption that the wow and flutter is about 10%, for convenience of understanding. However, in fact, in the usual tape recorder the wow and flutter is not that large, and is 1% at most. Also, in the example of FIG. 7, the flutter is assumed to be nearly 1,000 Hz, but the wow and flutter which actually causes inconveniences is 100 Hz or under.

In this embodiment, as mentioned above, the recorded signal has its waveform elongated or contracted, with respect to the waveform of the original signal, in accordance with the magnitude and phase of the wow and flutter occurring at the time of the feed of the tape 21, so that the signal recorded on the tape 21 has a waveform identical to the waveform of the original signal free of wow and flutter. Incidentally, in the digital memory 34, since the reading speed varies in response to the wow and flutter, whereas the writing speed is constant, the number of samples stored in the memory also varies accordingly. Therefore, in order to prevent the digital memory 34 from becoming empty, the reading action is controlled in such a way that the reading action does not take place until the writing action has been carried out for some time, so as to store a predetermined amount of data in the memory. This can be achieved by using the system in which the number of clock pulses written into the memory is counted and the reading action is started only after the counted number exceeds a predetermined value, or that the reading action is started after the writing action has been carried out for a certain length of time. Also, the mean writing speed has to be exactly the same as the mean reading speed, because if they not the same, the amount of the contents in the digital memory 34 can not be kept at a certain constant value during a long operation. This can be easily achieved, for instance, by providing an alternating current power supply having a frequency produced by reference clock pulses from the clock pulse generator 32, and driving a synchronous motor with the output from this power supply to feed the tape through a capstan coupled directly to this synchronous motor.

Alternatively, it is also possible to construct the system in such a way that, if the digital memory 34 is overloaded, the motor 25 is accelerated, and in the reverse case it is decelerated. By this arrangement, the wow and flutter can be eliminated and; also, the mean tape feed speed can be accurately regulated at the same time.

In the above-described embodiment, the tape speed is detected through detection of the speed of the capstan 24. However, this invention is not limited to the above-mentioned arrangement. That is, it is also possible to construct the system such a way that the speed of the pinch roller 23 is detected. As other measures for detecting the tape speed, a roller which rotates at the same speed as the tape 21 may be provided for detecting the feed speed of the latter.

In any event, it is important that the clock pulse generator can be controlled by means of a signal which represents the speed of the tape 21 in some way. In other words, it is only necessary that the speed at which the data in the digital memory 34 is subject to reading be in synchronism with the speed of the tape 21.

A system for reproducing the contents of a tape recorded according to the system of the invention will now be described.

Figure 8:
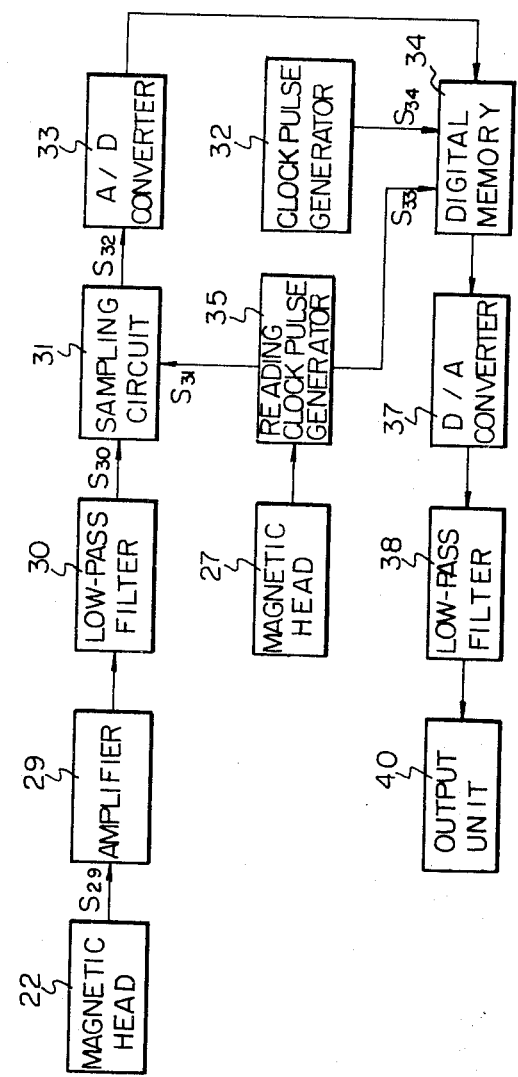
FIG. 8 is a block diagram illustrating an example of the reproducing circuit used in the embodiment of FIG. 5.

FIG. 8 is a block diagram of the recording/reproduction system according to the invention for reproducing the contents of a tape recorded according to the system of the invention. In FIG. 8, blocks corresponding to those in FIG. 6 are designated by identical reference numerals as those used in FIG. 6.

A signal recorded on the magnetic tape 21 through the magnetic head 22 now used for reproducing is supplied as electrical signal $S_{29}$ to the amplifier 29. The signal is amplified in the amplifier 29 and supplied to the low-pass filter 30 by which frequency components of 3,500 Hz or more contained in the reproduced signal $S_{29}$ are removed. The signal $S_{30}$, output from the low-pass filter 30, is then applied to a sampling circuit 31, which is supplied with sampling clock pulses $S_{31}$ from the clock pulse generator 35, to be sampled by the sampling clock pulses $S_{31}$. The sampling clock pulses $S_{31}$ have been produced by means of the signal produced from the magnetic head 27 in the same manner as in recording. The signal $S_{30}$ is sampled by the sampler 31 into an analog sampled signal $S_{32}$, by means of the sampling clock pulses $S_{31}$, with its period fluctuating in accordance with the wow and flutter produced in reproduction of the magnetic tape 21. The individual samples constituting the analog sampled signal $S_{32}$ are converted into digital values by the A/D converter 33 and are written into the digital memory 34 by a writing signal $S_{33}$. The signal $S_{33}$ is the same signal as the sampling clock pulses $S_{31}$. The data thus written into the digital memory 34 are read by reading clock pulses $S_{34}$, which are supplied from the reading clock pulse generator 32 with its period accurately set to 1/8,000 sec. As will readily be understood from the previous description directed to the recording operation with reference to FIG. 6, the fluctuating frequency components in the reproduced signal caused by the wow and flutter are already removed from the output data from the digital memory 34. The output data from the digital memory 34 is converted into a continuous analog signal through a D/A converter 37 and a low-pass filter 38, and this electrical reproduced signal is reinstated into voice by an output unit 40. Since the method for removal of the wow and flutter from the reproduced signal in the reproducing operation is substantially the same as that for removal of the wow and flutter from the recorded signal in the recording operation previously mentioned, no further description is herein presented.

The system of the invention employs a system which records the recording signal in the form of an analog signal. Therefore, according to the system of the invention, a much higher recording density than a digital signal recording/reproducing system, such as a PCM (Pulse Code Modulation) recording/reproducing system, can be obtained.

The mean reproducing speed can be regulated so as to have an accurate predetermined value, with reference clock pulses from the clock pulse generator 32 in the same manner as the mean recording speed, as previously described. Furthermore, if crystal controlled oscillator is employed in the clock pulse generator 32, the wow and flutter and the deviation in the mean tape speed can both be reduced to a value of $10^{-5}$.

Although a digital memory is used as memory device in the foregoing embodiment, the same effects can be expected even if an analog memory is used. Since the manner of using an analog memory is the same as that employed in the other embodiment previously described, a detailed description thereof is omitted here.

According to the embodiment shown in FIGS. 5, 6 and 8, even if a tape recorder having a tape feed mechanism which produces high wow and flutter is used, a recorded signal with very little wow and flutter can be recorded on the magnetic tape in the recording operation, and a reproduced signal with very little wow and flutter can be reproduced from the magnetic tape in the reproducing operation. The system according to the invention is particularly effective in such cases as recording/reproducing voice for a long time at a very small tape feed speed of 1 cm per second or under, or in reproducing music signals of good quality with high fidelity, or recording/reproducing physical phenomena with high accuracy.

Although the above description concerns an embodiment in which the invention has been applied to the magnetic tape recording/reproduction system, it goes without saying that the invention can equally be applied to a video tape system, a magnetic disk recording/reproduction system, a magnetic sheet recording/reproduction system, or a magnetic or optical sound reproduction of sound motion pictures.

FIG. 9 through FIG. 12 illustrate a further embodiment according to the system of the invention. This embodiment deals with a recording/reproduction system which comprises the steps of: permitting a magnetic head to scan a recording medium in a rectangular sheet form in parallel with one of the sides of said recording medium; analog recording a continuous analog signal desired to be recorded on each of the recording tracks formed by the scanning operation in a discontinuous manner, and; reproducing the contents thus discontinuously recorded as a continuous analog signal.

In FIG. 9, reference numeral 41 represents a magnetic sheet which is a recording medium in a rectangular sheet form, 42-1, 42-2, . . . 42-n recording tracks analog recorded on said recording medium 41, linearly and at a substantially uniform speed, and 43 a path along which the magnetic head comes back to the left side from the right side in recording and reproducing operations.

In the example of FIG. 9 the magnetic head, not illustrated, is moved from left to right on the magnetic sheet 41, linearly and at a substantially uniform or constant speed, to carry out magnetic recording on the recording track 42-1. Upon reaching the right end of the track, the recording heat is returned to the left end along the path of the dotted line 43, to again carry out magnetic recording on a part lower than the recording track 42-1 and in parallel therewith. In this manner, recording is carried out along a plurality or parallel recording tracks, like rasters in a television picture, on the magnetic sheet 41.

FIG. 10 is a schematic perspective view of a device for carrying out magnetic recording on the magnetic sheet 41 in the manner indicated in FIG. 9. In FIG. 10, reference numeral 44 represents a recording/reproducing magnetic head, 45 a guide along which the magnetic head can move in the lateral directions, 46 a wire for moving the magnetic head 44 along the guide 45 in the lateral directions and 47 a pulley for moving the wire 46; reference numeral 48 represents a motor for rotatively driving the pulley 47, 49 a carriage carrying the motor, 50 a guide for vertically guiding the carriage therealong and 51 another carriage paired with the carriage 49 and supporting the guide 45; the reference numeral 52 represents a guide for vertically guiding the carriage 51, 53 a wire for moving the carriage 51 vertically, 54 a pulley for moving the wire 53, 55 a motor for rotatively driving the pulley 54 and 56 a bed plate for supporting the guides 50, 52, motor 55.

The device in FIG. 10 operates as follows. As the magnetic head 44 is pulled by the wire 46 along the guide 45 from left to right, laterally of the bed plate, to move at a substantially uniform speed, a recording track 42 is formed on the magnetic sheet 41, not illustrated, which is placed over the device shown in FIG. 10. During the movement of the magnetic head, the carriage 49 remains stationary. When the magnetic head 44 reaches a predetermined position on the right side of the magnetic sheet 41, a limit switch 101 mounted on the magnetic head carriage 100 is actuated to reverse the rotation of the motor 48 so that the magnetic head 44 is moved leftwardly by the wire 46. At the same time, the motor 55 is actuated to advance the carriage 49 by a distance corresponding to the required width between adjacent recording tracks. Thus, the magnetic head 44 is pulled back to a predetermined position on the left side of the magnetic sheet 41 along the moving path shown by the dotted line 43 in FIG. 9. When the magnetic head 44 has reached the predetermined position on the left side, another limit switch 102 is actuated to change the connection of the power supply in a polarity for again reversing the rotation of the motor 48. As hereinafter described, no recording or reproducing operation is carried out as long as the magnetic head 44 is moved along the path shown by the dotted line 43 in FIG. 9. When returned to the left side of the magnetic sheet 41, the magnetic head 44 is positioned on the next track since it has been brought there by the carriage 49, and then, it is again pulled by the wire 46 rightwardly from that position for forming a further recording track.

In this fashion, recording is carried out on the magnetic sheet 41 in a dense, parallel and linear fashion. Since the recording speed is constantly maintained at a uniform value over the entire surface of the magnetic sheet 41 during the recording operation, recording can be carried out over the entire surface of the magnetic sheet 41 with the maximum recording density limited by the quality or performance of the magnetic sheet 41 and magnetic heat 44. As a result, this system can economically carried out the recording/reproducing operation.

It is conventionally known per se to magnetically record on a magnetic sheet in the manner as illustrated in FIG. 9 by the use of a device of such a construction as illustrated in FIG. 10. The use of the above-described device enables recording over the magnetic sheet 41 with a uniform recording density, and eliminates the disadvantage of the occurrence of a difference in recording density between the central portion and the boundary of a recording medium as seen in such as a recording disk. However, the device shown in FIG. 10 has the disadvantage that the recording operation is interrupted during the time the magnetic head 44 is returned from the right side to the left side of the magnetic sheet 41. Therefore, in the event that an input signal to be recorded continues to occur during the interruption, it is a problem how to deal with this.

Further, another problem exists with regard to the device illustrated in FIG. 10 with respect to fluctuations in the relative speed between the magnetic head 44 and the magnetic sheet 41 (wow and flutter), and fluctuations in the mean feed speed of the heat 44. Usually these fluctuations may have such large magnitude as cannot be ignored in reproducing the human voice and music, even if any improvement of the mechanism is made.

The above mentioned problems are solved by using the sampling theory and the memory as mentioned in the previously described embodiments. A concrete embodiment in which the invention has been applied to a system for recording the human voice, with its frequency band limited to 3.5 kHz and under, on a magnetic sheet, and reproducing the thus recorded voice signals will now be described.

FIG. 11 is a block diagram of the recording system which is used together with the mechanism shown in FIG. 10.

In FIG. 11, the reference numeral 57 denotes a microphone, 58 a low-pass filter, 59 an oscillator for generating a reference frequency with an accurate period and 60 an amplifier; the reference numeral 61 denotes a sampling circuit, 62 an A/D converter, 63 a digital memory and 64 a clock pulse generator; the reference numeral 65 denotes reading clock pulse generator, 66 a D/A converter, 67 a low-pass filter, 68 an amplifier and 44 a magnetic head for recording.

For the purpose of explanation, let it be assumed that the time in which the magnetic head 44 travels for recording at a constant speed from the left side or the right side of the magnetic sheet 41 in the device illustrated in FIG. 10 is $t_1$ sec. and the time in which the head returns without recording from the right side to the left side to come to the next track position is $t_2$ sec. Then, it is self-explanatory that, in order to record a voice signal generated with a duration of $t_1+t_2$ sec. the voice signal has to be compressed to a length of $t_1$ sec. before it is recorded on the magnetic sheet. Such signal compression can be attained by using the arrangement in which a signal recorded on a magnetic tape in a time of $t_1+t_2$ sec. is reproduced within $t_1$ sec. However, this method not only requires a recording/reproducing device incorporating an expensive tape transport, but also possesses the fatal drawbacks of inferior wow and flutter, and fluctuations in the mean tape feed speed.

According to the invention, the signal compression is carried out by electrical measures without resorting to mechanical measures. Referring to FIG. 11, a signal $S_{40}$ picked up by a microphone 57 is applied to a low-pass filter 58 where the signal has its frequency band restricted within a range of 3.5 kHz and under. The signal $S_{40}$ delivered from the filter 58 is mixed with a signal $S_{41}$ supplied from an oscillator 59, which is a reference signal with a single frequency higher than 3.5 kHz, 4 kHz for instance, and then applied to an amplifier 60. Thus, the analog signal has a frequency band of 4 kHz and under. The mixed signal is then supplied to a sampling circuit 61 where it is subjected to sampling at a sampling speed twice or more as high as 4 kHz or at a time interval of 1/10,000 sec., for instance, and the resulting samples are subjected to A/D conversion and stored in a digital memory 63. In these operations, a writing clock pulse and sampling clock pulse are supplied from a clock pulse generator 64. The contents of the digital memory 63 are read out by the use of a reading clock pulses $S_{50}$ from the reading clock pulse generator 65. In order that the reading operation by a reading clock pulse $S_{50}$ may be carried out only when the recording head 44 travels along recording tracks, a gate circuit 80 is provided through which the reading clock pulses $S_{50}$ are applied to the digital memory 63. The gate circuit 80 consists of one shot multivibrators 81, 82, a flip flop circuit 83, and an AND circuit 84. The monostable multivibrator 81 is supplied with an output signal $S_{102}$ from a limit switch 102, while on the other hand the monostable multivibrator 82 is supplied with an output signal $S_{101}$ from a limit switch 101. Thus, the one shot multivibrator 81 is arranged to be triggered by the output signal $S_{102}$ which is generated when the magnetic head 44 has returned to the left side of the magnetic sheet to actuate the limit switch 102. Upon the triggering of the multivibrator 81 the multivibrator 81 produces a pulse signal $P_1$ with a short pulse width for causing the flip-flop 83 to generate a one level output Q. Since the AND circuit 84 has one input terminal arranged to be supplied with the reading clock pulse $S_{50}$ and the other input terminal arranged to be supplied with output Q from the flip-flop 83, the reading clock pulse $S_{50}$ is supplied to the digital memory 63 via the AND circuit 84 when the flip-flop 83 generates a one level output Q. When the magnetic head 44 has reached the right side of the magnetic sheet 41 to actuate the limit switch 101, the one shot multivibrator 82 is triggered by the signal $S_{101}$, which in turn generates a pulse signal $P_2$ with a short pulse width. This pulse signal $P_2$ is applied to a reset input terminal R to reset the flip-flop 83 to zero, that is, a zero level output Q is supplied, so that supply of the reading clock pulse $S_{50}$ to the memory 63 is interrupted. When the magnetic head 44 has again returned to the left side, to actuate the limit switch 102, the reading clock pulse $S_{50}$ is again supplied to the memory 63. As will be understood from the above description, the limit switches 101, 102 and the gate circuit 80 cooperate to ensure the reading operation of the contents in the memory 63 only while the magnetic head 44 is moving from the left side to the right side along the predetermined recording tracks 42-1, 42-2, ... 42-n.

In the above-mentioned manner, the contents of the digital memory 63 are read out by the clock pulse from the clock pulse generator 65 is in sychronism with the movement of the recording head 44, and are then fed to the D/A converter 66. The period with which said reading clock pulse is supplied to the memory 63 should be limited to $t_2/t_1+t_2$ or less as large as the period with which the clock pulse is supplied from the other clock pulse generator 64. More specifically, assuming that $t_2/t_1$ is equal to 1/10, the period of the clock pulse from the clock pulse generator 65 should be set to 1/11000 sec. It is only required that the writing clock pulse have a time interval of 1/11000 sec. or less.

The signal from the D/A converter 66 reproduced within a time of $t_1$ sec. or less is allowed to pass a low-pass filter 67 where it is converted into a continuous analog signal, and then to pass an amplifier 68, to be recorded analogously on the magnetic sheet 41 by the magnetic head 44.

Then by changing the writing speed and the reading speed into or from the digital memory 63, an analog signal with a compressed time base can be obtained.

According to the present invention, the input signal is not recorded in digital form but recorded after it has been converted into analog form. This is because the latter can obtain a much higher recording density per unit area of the recording medium and, thus, is more economical.

Since the signal $S_{41}$ from the oscillator 59, oscillating at 4 kHz, has its frequency elevated by the compression of the time base, the low-pass filter 67 has its passing band widened in accordance with the amount of frequency elevation. In the above-described example, the low-pass filter 67 should consist of a low-pass filter having a cut-off frequency of more than 4.4 kHz=4 kHz×1.1, for passing frequencies of 4.5 kHz and under.

The signal which has been recorded in the above manner is reproduced by the use of a device illustrated in FIG. 10. In the reproducing operation, the magnetic head 44 which was used for recording may be directly used as a reproducing head. Alternatively, a separate reproducing head may, of course, be provided in the vicinity of the recording head.

FIG. 12 is a block diagram of an example of the reproducing system of the invention. The signal which has occurred with a duration of $t_1+t_2$ has been recorded in a time of $t_1$. That recorded signal is then reproduced in a time of $t_1$ by the use of the magnetic head 44. The signal thus reproduced by the magnetic head 44 is then amplified by an amplifier 69, and the resulting amplified output is divided by a low-pass filter 70 and a band-pass filter 71 into voice signal components and reference frequency signal components. The low-pass filter 70 deals with a signal with a compressed time base and, accordingly, is designed to have the higher cut-off frequency than that of the low-pass filter 58.

A signal $S_{42}$ supplied from the low-pass filter 70 is subjected to sampling by a sampling circuit 73 with reference clock pulses $S_{44}$, which are produced by a clock pulse generator 72 from a signal $S_{43}$ supplied from the band-pass filter 71. A sampled signal $S_{45}$, thus obtained, is converted into a digital signal by an A/D converter 74, and written into a digital memory 76. The clock pulse from the clock pulse generator 72 is used for that writing. The contents thus stored in the digital memory 76 in a time of $t_1$ are read out in an exact time of $t_1+t_2$ by clock pulse $S_{46}$ from a reading clock pulse generator 75. The digital signal thus read out is then converted by a D/A converter 77 into an analog signal $S_{47}$ in discrete form, which in turn is reinstated into a continuous analog signal or the original signal by a low-pass filter 78, to be available as an output through an output unit 79 formed by an amplifier, a loud speaker, etc.

In the above-mentioned way, an analog signal continuously occurring with a duration of $t_1+t_2$ is recorded in a compressed time of $t_1$, and is reproduced by reinstating it in the same time of $t_1+t_2$.

Since it is so arranged that the speed at which data are written into the digital memory 63 is shorter than the speed at which data are read from the memory 63, reading operation has to be suspended until after the amount stored in the memory has reached a certain value. In the above-described example, the reading operation should be started after the digital memory has stored at least $t_2/t_1$ as large as the contents equivalent to those on two recording tracks on the magnetic sheet 1. Accordingly, the recording motion of the magnetic head 44 had to be controlled in accordance with the amount of data stored in the digital memory 63.

Since the actual amount of data stored in the digital memory 63 may be determined by counting the number of writing clock pulses and that of the reading clock pulses supplied to the memory 63 by means of an adder-subtracter, it can be determined on the basis of the counted value when the motor 48 should be actuated for driving the magnetic head 44. Alternatively, the digital memory 63 may be designed to have a capacity sufficiently larger than the actually required capacity, so that the motor 48 is not started until after a predetermined time has passed since the start of the input operation, within which predetermined time a sufficient amount of data will have been written into the digital memory.

As for the digital memory 76, since the writing speed is larger than the reading speed, the reading action can be initiated simultaneously with the start of the writing action.

A signal can be reproduced in a continuous manner as the magnetic head 44 moves from one recording track to the next reading track in FIG. 1, by reproducing the signal in the same time of $t_1+t_2$ as the recording time of $t_1+t_2$ at which the signal was recorded. Accordingly, if, for example, the clock pulse speed of the clock pulse generator 72 is set to n times as large as that of the reference frequency reproduced, the reading clock pulse speed of the clock pulse generator 75 for reproduction has only to be set to n times as large as that of the reference frequency supplied from the oscillator 59 for recording. In the described embodiment, since n is equal to 2, the clock pulse generator 75 has only to supply clock pulses at a speed double the frequency of 4 kHz, or with a period of 1/8,000 sec. Thus, by controlling the oscillator 59 to have an accurate predetermined frequency of oscillation by the use of a crystal oscillating element, or the like, so as to fix the clock pulse period of the clock pulse generator 75 on the basis of said predetermined frequency of oscillation, a continuous reproduced signal can be obtained with practically sufficient stability. It is sufficient if the clock pulse generator 64 is capable of always generating clock pulses at a speed twice or more as large as that the reference frequency as long as the speed or period is stable. Also, it is sufficient if the period of the clock pulses generated by the clock pulse generator 65 is a stable period which is $t_2/t_1+t_2$ or less as large as the clock pulse period of the clock pulse generator 64, or in the proximity thereof, so as to complete writing a signal occurring with a duration of $t_1+t_2$ within a time of $t_1$.

However, the mean value of the period for the reciprocal movement of the magnetic head 44 is required to be exactly $t_1+t_2$, so that the digital memories 63 and 76 may neither be exhausted nor overflow with stored data. For this purpose, the motor 48 or the motor 55 may be controlled with reference to the contents stored in the digital memory 63 or 76. Or, a clock means with high precision may be used for controlling the internal of time at which the recording motion for each recording track is started so that it is exactly the time of $t_1+t_2$.

In a recording/reproducing system using a conventional type motor, it is impossible to accurately control the speed at which the magnetic head 44 is moved on the magnetic sheet 41. As a result, the relative mean speed between the head 44 and the sheet 41 changes, and, moreover, wow and flutter are produced. According to the present invention, the signal component due to the wow and flutter and the fluctuation caused by the instability of the driving mechanism, can be completely electrically eliminated from the reproduced signal. Therefore, it is acceptable to use an unstable driving mechanism for driving the head. Thus, the overall cost of the system can be greatly reduced.

Thus, the present embodiment can maintain the wow and flutter at a very small value substantially as large as that obtained by the two embodiments previously described. Since the reason for such large reduction in wow and flutter according to the present embodiment is essentially the same as that according to the previously described embodiments description of the reason will now be only briefly set forth with reference to FIG. 13.

FIG. 13 shows waveforms of the signals available in various portions of FIGS. 11 and 12 in the case of reproducing and recording a signal having a frequency of 2,000 Hz by the use of the system according to the invention. In FIG. 13, the reference numeral $S_{40}$ denotes the signal of 2,000 Hz, $S_{41}$ a reference signal having a frequency of 4,000 Hz, $S_{42}$ a signal containing wow and flutter and with a compressed time base, and $S_{43}$ a reference signal containing wow and flutter and with a compressed time base; reference numeral $S_{44}$ denotes a sampled clock pulses obtained by the reproduced reference frequency signal $S_{41}$, $S_{46}$ predetermined accurate reading clock pulses, $S_{47}$ a sampled signal read with clock pulses of the same interval of time as that at which the signal $S_{40}$ has been sampled by the accurate reading clock pulses $S_{46}$ and $S_{48}$ a signal obtained by converting the sampled signal $S_{47}$ into a continuous signal through a low-pass filter 78, which has an identical waveform as that of the original signal. As a result, a signal which is free of the influence of the wow and flutter can be obtained.

Next, the reason fluctuations in the means relative speed between the magnetic sheet and the magnetic head have been removed according to the present invention will be discussed. As mentioned above, the signal to be recorded has been recorded together with a signal having a predetermined accurate frequency, e.g., 4 kHz in the illustrated embodiment. Actually, the reference signal has a frequency of 4.4 kHz when recorded on the magnetic sheet 41 due to the compression of the time base thereof, in this embodiment. The amount of a recording signal which can be contained in a single recording track is exactly proportional to the amount of the reference signal.

Assuming now that the speed at which the clock pulses are supplied from the clock pulse generator 72 is n times as large as the frequency of the reference signal reproduced, the speed at which the clock pulses are supplied from the clock pulse generator 75 is accordingly n times as large as the oscillation frequency of the oscillator 59. As a result, the number of samples written into the digital memory 76 in a longer time the time of $t_1+t_2$ in the reproducing operation is coincidental with the number of samples read out of the digital memory 76 in the same time as above. Also its reading speed is associated with the reference frequency generated by the oscillator 59 in the recording operation. Accordingly, the mean reading speed is the same in the recording operation and the reproducing operation. Since any deviation from the prescribed mean speed depends solely upon the precision of the oscillator 59, it is easy to keep the deviation of the means speed from a prescribed value within a value of $10^{-5}$, as hereinbefore defined, if the oscillator is a crystal control oscillator.

It should be noted that the deviation of the feed speed of the magnetic head 44 from a prescribed value does not depend upon the difference in the feed speed of the magnetic head between the recording operation and the reproducing operation, that is, the difference in the frequency between the recorded signal and the reproduced signal. Therefore, a high-quality driving motor need not be used for reducing the deviation of the mean feed speed of the magnetic head. However, it is desirable to avoid a large difference in the feed speed of the magnetic head e.g., of 10% or more, between the recording operation and the reproducing operation in view of the presently available characteristics of the low-pass filter 70 and the band-pass filter 71. In this regard, this difference in the magnetic head speed can be easily kept within plus or minus 3 through 5%, on the average, with the conventional art.

In view of the fact that it is extremely difficult to keep the deviation of the mean feed speed of the magnetic head within a value of $10^{-5}$ according to the conventional art, even in a very excellent tape recorder, it will be readily understood how valuable and significant the present invention is.

In the above-described embodiment, the memory used is a digital memory. However, the principle of the invention is not limited to examples in which the digital memory is used, and the same results can be obtained by using an analog memory instead, as is the case with the two previously described embodiments.

As described above, it is possible according to the invention to record an analog signal which is continuously input to the system in a group of discrete blocks obtained by dividing the analog signal into such blocks and, when reproducing the recorded signal, it is also possible to reproduce the signal as an analog signal identical to the original signal. Still further, the wow and flutter and the fluctuations in the mean relative speed between the magnetic head and the magnetic sheet can be kept within very small values.

Although the above-described embodiment concerns an example in which voice is recorded on a magnetic sheet or the recorded voice is reproduced by means of a magnetic head, the present invention can be applied to optical recording on an optical sheet as well. In such an application, a light sensitive film, such as photographic film, may be used in place of the magnetic sheet, the head of an electrical energy-to-light converter, such as light emission diode (LED), may be used for the magnetic head in the recording operation, and the head of a light-to-electrical energy converter may be used in place of the magnetic head in the reproducing operation. Also in this application, excellent results are obtainable with high fidelity to the full extent of the resolution possessed by the light sensitive film used.

Furthermore, the foregoing description deals with the reproduction of a voice signal, but the invention is not limited to voice signals. The system according to the invention can be applied to the recording of music or a physical amount, such as the magnitude of oscillation or vibration of an object, or to analog recording of optical images, such as literature or writing as well as to recording of television images.

As set forth in the foregoing, according to the invention, a substantially uniform recording density is available at every point on the surface of the magnetic sheet and, accordingly, a far larger amount of recording can be achieved than in the case of recording on a magnetic disk. Three to five hours of voice recording can be made on a magnetic sheet with a size of 21×30 cm, even with the current technical level of the magnetic sheet and the magnetic head, according to the system of the invention. Also, since the relative speed between the magnetic head and the magnetic sheet can be maintained at a substantially constant speed at every point on the surface of the magnetic sheet, a frequency compensating device, if used in the reproducing operation of the system according to the invention, can be of simple construction. Still further, as distinct from the case with the conventional type tape recorder, the recording/reproduction system of the invention not only has a much smaller value of wow and flutter, but also can perform operations such as access or locating of a portion of the recording medium desired to be reproduced or repeated playback of the same portion thereof, in far shorter times than the conventional type tape recorder and in a simple manner, just as in the case of dealing with the conventional disk (phonograph record). That is, so-called random access is feasible.

As for the magnetic sheet, the present invention offers another advantage over the conventional disk in that erasing is also possible, as well as recording. In other words, the present invention possesses at the same time two advantages, i.e., the feasibility of erasing a recording signal as with the conventional type tape recorder, and short access time as featured by the conventional disk. Further, the magnetic sheet can be designed even smaller in size than the conventional long-playing record, for the same capacity.

In addition to the above mentioned advantages, the present invention offers excellent values of wow and flutter, and fluctuations in the means relative speed between the recording medium and the magnetic head, which are far superior to those obtained by the conventional type tape recorder or the conventional phonograph.

As is evident from the foregoing, application of the present invention to the field of recording reproduction through a magnetic sheet or an optical sheet will enable the manufacture of far more excellent recording reproduction devices at very low costs, thus providing economically and qualitatively excellent effects.

What is claimed is:

1. A method for reproducing a signal of the type containing an analog signal and a reference signal superposed thereon from a recording medium which moves relative to a sensor, comprising the steps of:
   sampling said analog signal from said sensor to produce samples at a first rate determined by said reference signal from said sensor;
   storing said samples in a memory at said first rate;
   reading out said samples from said memory at a fixed predetermined frequency;
   converting said samples read out from said memory into a continuous analog signal;
   monitoring the number of said samples contained in said memory; and
   controlling the speed of motion of said recording medium relative to said sensor in a manner effective to maintain said number of samples contained in said memory at a predetermined amount.

2. A method according to claim 1 further comprising delaying the start of the step of reading out until the number of said samples contained in said memory reaches said predetermined amount.

3. A method for discontinuously recording a continuous signal of the type containing an analog signal and a reference signal having a first fixed frequency superposed thereon on a recording medium which moves relative to a recording device, comprising:
   sampling said continuous signal at a second frequency to produce discrete samples thereof;
   said second frequency being at least twice said first frequency;
   storing said discrete samples in a memory;
   reading out said discrete samples in a first period at a third frequency substantially higher than said second frequency;
   halting said reading out between an end of a preceding first period and a beginning of a following first period;
   converting said discrete samples into a second signal occurring discontinuously; and
   recording said second signal by said recording device on said recording medium.

4. A method according to claim 3 wherein said recording medium includes a sheet-type recording medium and the step of recording includes producing a first relative motion of said recording medium and said recording device to define a recording track on said sheet-like recording medium during said first period and producing a second relative motion of said recording medium and said recording device to move to a beginning of a next recording track on said sheet-like recording medium during said second period.

5. A method for reproducing a continuous signal which has been discontinuously recorded during a plurality of first periods separated by second periods on a recording medium which moves with respect to a sensor, said continuous signal containing an analog signal having a reference signal superposed thereon, comprising the steps of:
   sampling the discontinuously recorded signal at a first frequency to produce discrete samples;
   said first frequency being related to said reference signal reproduced by said sensor;
   storing said discrete samples in a memory;
   reading out said samples from said memory at a fixed predetermined second frequency;
   said second frequency being related to said first frequency such that said samples read out from said memory do not contain gaps; and
   converting said samples read out from said memory into a converted continuous signal.

* * * * *